US009883641B2

(12) United States Patent
Thomas (10) Patent No.: US 9,883,641 B2
(45) Date of Patent: Feb. 6, 2018

(54) SPRINKLER CONTROL SYSTEMS AND METHODS (71) Applicant: Vivint, Inc., Provo, UT (US)

(72) Inventor: Jeffrey G. Thomas, Draper, UT (US)

(73) Assignee: Vivint, Inc., Provo, UT (US)

( * ) Notice: Subject to any disclaimer, the term of this patent is extended or adjusted under 35 U.S.C. 154(b) by 57 days.

(21) Appl. No.: 14/272,212

(22) Filed: May 7, 2014

(65) Prior Publication Data
US 2015/0319942 A1 Nov. 12, 2015

(51) Int. Cl.
*G05D 11/00* (2006.01)
*A01G 25/16* (2006.01)

(52) U.S. Cl.
CPC .......... *A01G 25/16* (2013.01); *A01G 25/165* (2013.01)

(58) Field of Classification Search
CPC ............ A01G 25/16; G05B 2219/2625; G05B 15/02; G05B 19/0426; G05B 2219/25314; G05B 2219/31422; G05B 2219/32126; G05B 2219/25056; Y10T 137/1866; Y10T 137/86389
See application file for complete search history.

(56) References Cited

U.S. PATENT DOCUMENTS

| | | | | |
|---|---|---|---|---|
| 6,141,720 A * | 10/2000 | Jeffords | ..................... | G06F 9/52 710/108 |
| 6,898,467 B1 * | 5/2005 | Smith | ..................... | G05B 15/02 700/20 |
| 6,940,811 B2 * | 9/2005 | McDermott | .......... | G06F 11/182 370/229 |
| 6,943,667 B1 * | 9/2005 | Kammer | ............... | G06F 1/3203 340/286.01 |
| 8,127,063 B2 * | 2/2012 | Sherriff | ............ | G05B 19/41865 700/100 |
| 8,392,008 B2 * | 3/2013 | Weatherhead | .......... | G06F 9/526 700/100 |
| 8,397,006 B2 * | 3/2013 | Eckermann | ........... | G06F 13/372 345/535 |
| 2002/0027878 A1 * | 3/2002 | McDermott | .......... | G06F 11/182 370/221 |
| 2003/0021244 A1 * | 1/2003 | Anderson | ......... | H04M 1/72522 370/329 |
| 2003/0093159 A1 * | 5/2003 | Sieminski | ............ | A01G 25/167 700/12 |
| 2004/0139134 A1 * | 7/2004 | Feather, Jr. | ......... | G06F 11/3433 708/300 |
| 2004/0249477 A1 * | 12/2004 | Blanpain | ................ | G08C 17/00 340/12.23 |
| 2005/0107924 A1 * | 5/2005 | Bailey | .................. | A01G 25/167 700/284 |
| 2007/0010915 A1 * | 1/2007 | Burson | .................. | A01G 25/16 700/284 |

(Continued)

*Primary Examiner* — Darrin Dunn
(74) *Attorney, Agent, or Firm* — Holland & Hart LLP (57) ABSTRACT

Methods, systems, and devices are described for controlling a sprinkler system, including an apparatus for sprinkler system control that includes a processor, a memory in electronic communication with the processor, and instructions stored in the memory. The instructions are executable by the processor to receive operation instructions for the sprinkler system from a source that is separate from a control panel of the sprinkler system, and operate valves of the sprinkler system independent of instructions from the control panel.

23 Claims, 8 Drawing Sheets (56) References Cited

U.S. PATENT DOCUMENTS

| | | | | |
|---|---|---|---|---|
| 2008/0098401 A1* | 4/2008 | Weatherhead | G06F 9/526 | 718/104 |
| 2009/0099701 A1* | 4/2009 | Li | A01G 25/16 | 700/284 |
| 2009/0312853 A1* | 12/2009 | Kore | G05B 19/4185 | 700/90 |
| 2010/0038440 A1* | 2/2010 | Ersavas | A01G 1/00 | 236/51 |
| 2011/0015797 A1* | 1/2011 | Gilstrap | G05B 15/02 | 700/291 |
| 2011/0035059 A1* | 2/2011 | Ersavas | A01G 1/00 | 700/276 |
| 2011/0090408 A1* | 4/2011 | Ergen | G08C 17/02 | 348/734 |
| 2011/0106276 A1* | 5/2011 | Donnell | H01R 9/2408 | 700/19 |
| 2011/0224836 A1* | 9/2011 | Hern | G01W 1/14 | 700/284 |
| 2012/0191261 A1* | 7/2012 | Nickerson | A01G 25/16 | 700/284 |
| 2012/0210142 A1* | 8/2012 | Ichiki | G06F 1/3209 | 713/300 |
| 2012/0215366 A1* | 8/2012 | Redmond | A01G 25/167 | 700/284 |
| 2012/0239211 A1* | 9/2012 | Walker | A01G 25/16 | 700/284 |
| 2012/0290139 A1* | 11/2012 | Brundisini | A01G 25/16 | 700/284 |
| 2013/0054033 A1* | 2/2013 | Casilli | H04L 12/282 | 700/276 |
| 2013/0063241 A1* | 3/2013 | Simon | G08B 25/14 | 340/3.1 |
| 2013/0085619 A1* | 4/2013 | Howard | G05D 7/0623 | 700/284 |
| 2013/0226357 A1* | 8/2013 | Ersavas | A01G 1/00 | 700/284 |
| 2013/0282180 A1* | 10/2013 | Layton | G05B 15/02 | 700/275 |
| 2014/0020033 A1* | 1/2014 | Wilson | H04L 12/2807 | 725/80 |
| 2014/0031996 A1* | 1/2014 | Nickerson | A01G 25/16 | 700/284 |
| 2014/0094977 A1* | 4/2014 | Marsters | A01G 25/16 | 700/284 |
| 2014/0129039 A1* | 5/2014 | Olive-Chahinian | A01G 25/16 | 700/284 |
| 2014/0172180 A1* | 6/2014 | Woytowitz | A01G 25/16 | 700/284 |
| 2014/0229024 A1* | 8/2014 | Wang | A01G 25/165 | 700/284 |
| 2014/0236868 A1* | 8/2014 | Cook | A01G 25/16 | 705/412 |
| 2015/0073393 A1* | 3/2015 | Moberg | G06F 19/3406 | 604/890.1 |
| 2015/0150201 A1* | 6/2015 | Marsters | A01G 25/16 | 700/284 |

* cited by examiner

SPRINKLER CONTROL SYSTEMS AND METHODS

BACKGROUND

Advancements in media delivery systems and media-related technologies continue to increase at a rapid pace. Increasing demand for media has influenced the advances made to media-related technologies. Computer systems have increasingly become an integral part of the media-related technologies. Computer systems may be used to carry out several media-related functions. The wide-spread access to media has been accelerated by the increased use of computer networks, including the Internet and cloud networking.

Many homes and businesses use one or more computer networks to generate, deliver, and receive data and information between the various computers connected to computer networks. Users of computer technologies continue to demand increased access to information and an increase in the efficiency of these technologies. Improving the efficiency of computer technologies is desirable to those who use and rely on computers.

With the wide-spread use of computers and mobile devices has come an increased presence of home and business automation and security products. Advancements in mobile devices allow users to monitor an aspect of a home or business. As home automation and security products expand to encompass other systems and functionality in and surrounding the home or business, opportunities exist for enhancing communications between and control of auxiliary systems associated with the home or business.

SUMMARY

Methods and systems are described for providing control of a sprinkler system. In one example, an apparatus for sprinkler system control includes a processor, a memory in electronic communication with the processor, and instructions stored in the memory. The instructions are executable by the processor to receive operation instructions for the sprinkler system from a source that is separate from a control panel of the sprinkler system, and operate valves of the sprinkler system independent of instructions from the control panel.

In some embodiments, operating the valves of the sprinkler system includes overriding instructions sent from the control panel to the valves. The apparatus may be positioned in-line between the control panel and the valves. Receiving operation instructions may include receiving communications from a home automation and security system. The instructions may be executable by the processor to communicate valve operation status information to the home automation and security system. The communications may be transmitted wirelessly. Receiving operation instructions may include actuation of a system delay button. Receiving operation instructions may include receiving communications from a mobile device. Operating the valves of the sprinkler system may include operating a limited number of the valves.

Another embodiment relates to a computer-program product for controlling a sprinkler system. The computer-program product includes a non-transitory computer-readable medium storing instructions executable by a processor to receive instructions for operation of valves of the sprinkler system from a source that is separate from a control panel of the sprinkler system, and operate the valves independent of and by overriding signals from the control panel to the valves.

In some embodiments, receiving instructions includes receiving instructions from an automation and security system. Receiving instructions may include receiving instructions from a remote device. The instructions from the remote device may be directed through a control panel of an automation and security system. The instructions may be executable by the processor to block signals from the control panel to the valves prior to operating the valves. The instructions may be executable by the processor to monitor frequency and duration of operation of the valves. Operating the valves of the sprinkler system may include turning the valves on and off and operating the valves for select time periods.

A further embodiment relates to a computer-implemented method for controlling a sprinkler system. The method includes receiving instructions for operation of valves of the sprinkler system from a source that is separate from a control panel of the sprinkler system, blocking signals from the control panel to at least some of the valves, and operating the valves independent of operation of the control panel.

In some embodiments, the method includes transmitting information related to operation of the valves to an automation and security system. The method may include transmitting information related to operation of the valves to a remote device that is separate from the control panel. Receiving instructions may include receiving instructions from an automation and security system.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the spirit and scope of the appended claims. Features which are believed to be characteristic of the concepts disclosed herein, both as to their organization and method of operation, together with associated advantages will be better understood from the following description when considered in connection with the accompanying figures. Each of the figures is provided for the purpose of illustration and description only, and not as a definition of the limits of the claims.

BRIEF DESCRIPTION OF THE DRAWINGS

A further understanding of the nature and advantages of the embodiments may be realized by reference to the following drawings. In the appended figures, similar components or features may have the same reference label. Further, various components of the same type may be distinguished by following the reference label by a dash and a second label that distinguishes among the similar components. If only the first reference label is used in the specification, the description is applicable to any one of the similar components having the same first reference label irrespective of the second reference label.

While the embodiments described herein are susceptible to various modifications and alternative forms, specific embodiments have been shown by way of example in the drawings and will be described in detail herein. However, the exemplary embodiments described herein are not intended to be limited to the particular forms disclosed. Rather, the instant disclosure covers all modifications, equivalents, and alternatives falling within the scope of the appended claims.

DETAILED DESCRIPTION

As will be appreciated, many homeowners and business use sprinkler system controls to automate the use of sprinkler systems when irrigating lawns, trees, flowerbeds, or other landscaping elements. Sprinkler systems are typically divided into one or more sprinkler zones, with each zone comprising one or more water distribution devices (e.g., sprinklers, drip devices, etc.). The flow of water to each zone in the sprinkler system is typically controlled using one or more valves. Sprinkler system controls make use of digital or analog circuitry, or even mechanical timers, to programmatically actuate these valves and to, in turn, regulate the flow of water to the sprinkler zones. Sprinkler system controls therefore enable a user to program, via user input at a sprinkler system control panel, one or more programmatic rules that control the flow of water to the sprinkler zones. Typical rules control the duration of operation of each zone, order of operation of the zones, and days on which the zones are to operate. By way of illustration, a simple sprinkler system might have two zones (e.g., zone 1 and zone 2). For this sprinkler system, a user might create rules that operate zone 1 for 10 minutes and zone 2 for five minutes starting a 9 p.m. on Monday, Wednesday, and Friday.

Some sprinkler system controls may include more advanced scheduling functionality. For instance, some sprinkler system controls may communicate with a range sensor that detects past or present rainfall. Using the rain sensor, the sprinkler system control may make a decision to forego or modify execution of one or more rules. For instance, if it is determined, based on the range sensor, that it is currently raining or that it has recently rained, the sprinkler system control may make a decision to forego watering one or more zones. Furthermore, based on one or more of calendar dates, detected rainfall, or even manual user input, some sprinkler system controls may make adjustments to the duration of operation of one or more sprinkler zones (e.g., a seasonal adjustment, etc.). Sprinkler system controls have eased the burden involved in operating sprinkler systems, as the sprinkler systems may operate largely without user input once the system controls have been initially configured. Furthermore, sprinkler system controls reduce the amount of water consumer during watering by reducing the amount of human error involved in timing operation of sprinkler systems by considering past or current rainfall and by making seasonal adjustment to watering duration. Despite these advances, however, sprinkler system controls may be difficult to operate and monitor, requiring personal presence at the sprinkler system control panel. Furthermore, zone configuration rules are rigidly applied and fail to consider factors beyond past or current rainfall or pre-programmed adjustments.

The systems and methods described herein relate to control of sprinkler systems, such as indoor and/or outdoor lawn and gardening sprinkler systems. One aspect of the present disclosure relates to controlling a sprinkler system via a home automation and security system. More particularly, the systems and methods described herein relate to an in-line controller that is positioned between the valves and/or sprinkler heads of the sprinkler system (generally referred to as "sprinkler valves") and the control panel of the sprinkler system. The in-line controller is operable independent of the sprinkler system control panel to control operation of the sprinkler valves.

The in-line controller may receive instructions from various sources including, for example, a home automation and security system, a remote device such as a handheld control device (e.g., cell phone), or the sprinkler system control panel. Additionally, or alternatively, the in-line controller may include a user interface, actuator, or other input feature for manual input of instructions from a user. The home automation and security system may include a control panel having a user interface. A user may manually input instructions for the sprinkler system into the control panel of the automation and security system which are transmitted to the in-line controller. The automation and security system may additionally, or alternatively, providing instructions to the in-line controller automatically in response to, for example, real-time conditions such as past or current weather conditions, weather forecasts, a status of the automation and security system (e.g., armed, sleep, etc.), and pre-programmed operation settings. Instructions from the remote device may be transmitted directly to the in-line controller. Alternatively, instructions from the remote device may be routed through the home automation and security system (e.g., through the control panel for the home automation and security system).

Providing an independently operable in-line controller between the sprinkler system control panel and the valves and/or sprinkler heads of the sprinkler system makes it possible to control the sprinkler system using a separate, sometimes more convenient, control mechanism in addition to using the sprinkler system control panel. Users often become comfortable with operation of a given sprinkler system control panel after months or years of use. This familiarity is lost if the sprinkler system control panel is replaced with a different control panel that is compatible with and controllable by a home automation and security system or other control system and/or device, such the control panel disclosed in U.S. Patent Publication No. 2013/0035774, entitled "System Automation Via An Alarm System," which application is incorporated herein in its entirety by this reference. The control panel of the automation and control systems disclosed herein may be adapted to include any of the features and functionality of the alarm system control panel disclosed in U.S. Patent Publication No. 2013/0035774.

The in-line controllers and related systems and methods of sprinkler system control disclosed herein permit ongoing use of the same sprinkler control panel and corresponding familiarity of the sprinkler system control panel by the operator, while also providing additional and/or alternative control of the sprinkler valves of the sprinkler system via the home automation and security system or other device. Adding control of the sprinkler system via the home automation and security system may provide the user with additional convenience for operation of the sprinkler system from many locations (e.g., within the home/business and/or remotely using a remotely positioned control device such as a cell phone app) and potentially additional control programmability in addition to separately operating the sprinkler system control panel.

Figure 1:
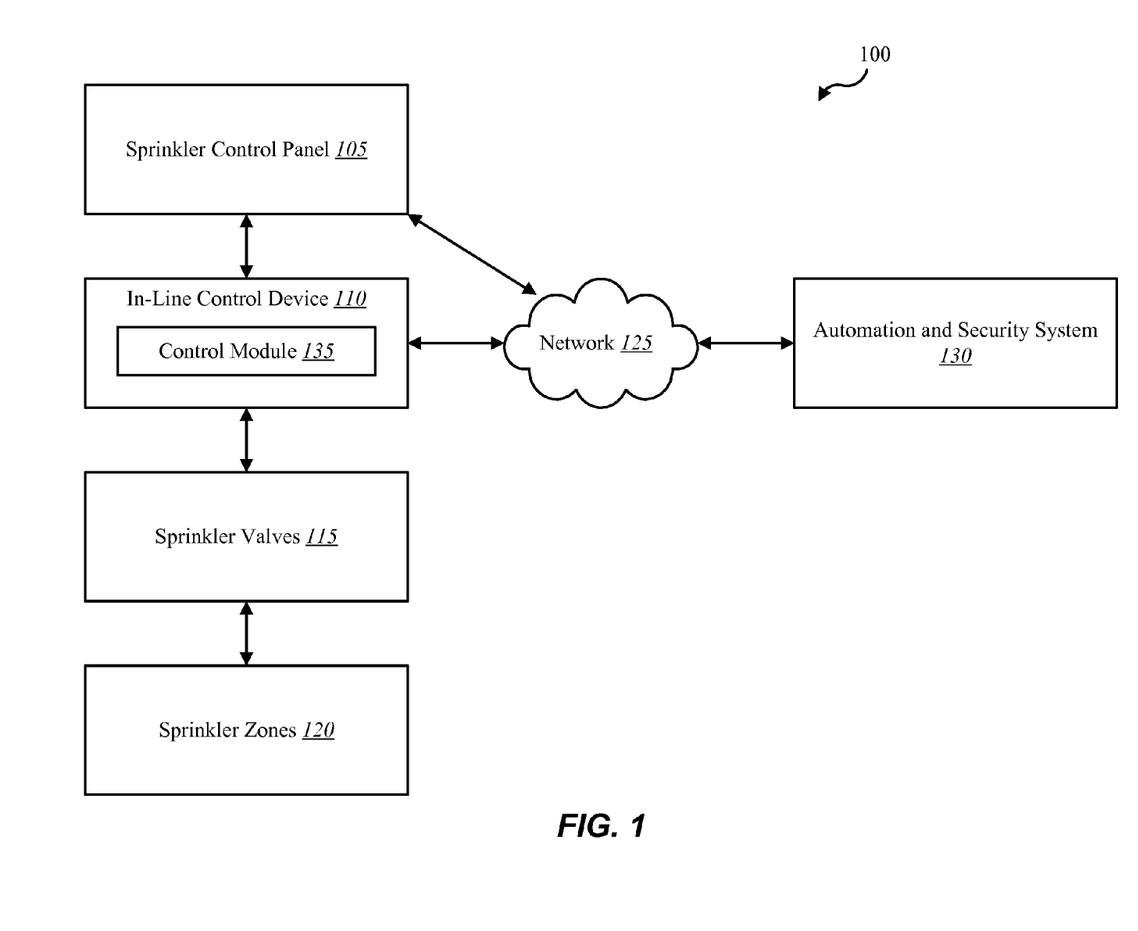
FIG. 1 is a block diagram of an environment in which the present systems and methods may be implemented.

Referring now to FIG. 1, a block diagram illustrates one embodiment of an environment 100 in which the present systems and methods may be implemented. In some embodiments, the systems and methods described herein are performed on one or more devices (e.g., an in-line control device 110 and/or control module 135).

The environment 100 may include a sprinkler control panel 105, an in-line control device 110, sprinkler valves 115, and sprinkler zones 120. The sprinkler control panel 105 and in-line control device 110 may communicate with an automation and security system 130 via a network 125. In at least some examples, other types of devices and systems may communicate with sprinkler control panel 105 and in-line control device 110 via network 125 or directly by bypassing network 125. The sprinkler valves 115 may include at least one valve that controls at least one sprinkler zone. Each sprinkler zone may include at least one sprinkler head or other water dispensing device as discussed above.

In-line control device 110 includes a control module 135. Control module 135 may transmit and receive communications between in-line control device 110 and sprinkler control panel 105 and/or automation and security system 130. Control module 135 may also provide communications between in-line control device 110 and sprinkler valves 115. Additional details and functionality of control module 135 are described below with reference to FIG. 4.

In alternative systems, such as those disclosed in U.S. Patent Application No. 2013/0035774, which is incorporated by reference above, sprinkler control panel 105 communicates directly with sprinkler valves 115 without an in-line control device 110 positioned there between. In-line control device 110 may be physically positioned in series between sprinkler control panel 105 and sprinkler valves 115. In-line control device 110 may intercept or block control signals being sent from sprinkler control panel 105 to sprinkler valves. In-line control device 110 may transmit separate and independently-generated control signals to sprinkler valves 115 in place of the control signals sent from sprinkler control panel 105, thereby overriding operation of sprinkler control panel 105 as it relates to control of sprinkler valves 115.

When in-line control device 110 is in an inoperable state (e.g., in a sleep mode), in-line control device 110 acts as a pass-through device that permits transmission of control signals from sprinkler control panel 105 to sprinkler valves 115. Accordingly, environment 100 provides dual mode control of the sprinkler system. In a first mode, in-line control device 110 acts as a pass-through device to permit control of sprinkler valves 115 directly from the sprinkler control panel 105. In a second mode, in-line control device 110 is operable to intercept or block control signals from sprinkler control panel 105 that were intended for control of sprinkler valves 115, and/or send control signals via control module 135 for control of sprinkler valves 115 independent of operation of sprinkler control panel 105.

In-line control device 110 may be controlled via a variety of control scenarios. For example, in-line control device 110 may be operable in response to control signals delivered from automation and security system 130. In other examples, in-line control device 110 may include a user interface, actuation button, or other feature that permits manual control of in-line control device 110 (e.g., on/off or between various operation modes). For example, in-line control device 110 may include a snooze (e.g., rain delay) button, which when actuated by a user causes blocking of control signals from sprinkler control panel 105 to sprinkler valves 115 to essentially turn off the sprinkler system so no water is dispensed for a predetermined amount of time. In-line control device 110 may include an operation button, which when actuated by a user may cause operation of sprinkler valves 115. The snooze mode may be used as a rain delay, such as when there rain has fallen or there is a forecast for rain and the user wants to turn off the sprinkler system for a predetermined amount of time (e.g., 24 hours). The "on" mode may be used during particularly dry weather and the user wants to operate sprinkler valves 115 for extra watering of a lawn and/or garden.

In at least some examples, as discussed above, sprinkler control panel 105 is incompatible with the automation and security system 130. As such, the automation and security system 130 cannot provide control of sprinkler control panel 105. In-line control device 110 may be designed to permit communication with automation and security system 130. As such, when in-line control device 110 is physically positioned in series between the sprinkler control panel 105 and the sprinkler valves 115, a user may be able to control a sprinkler system (e.g., sprinkler valves 115 and/or sprinkler zones 120) via the automation and security system 130. The user may be able to provide additional controls for the sprinkler system from other locations and according to additional criteria (e.g., at various control panels of the automation and security system 130, and/or according to criteria such as weather conditions).

The network 125 provides communication via, for example, wired or wireless connections. Further, the network 125 may include a plurality of communication mediums. For example, network 125 may include different communication mediums to provide communication between sprinkler control panel 105 and automation and security system 130, and between in-line control device 110 and automation and security system 130. Examples of network 125 includes cloud networks, local area networks (LAN), wide area networks (WAN), virtual private networks (VPN), wireless networks (using 802.11, for example), and/or cellular networks (using 3G and/or LTE, for example), etc. In some embodiments, the network 125 may include the Internet.

Sprinkler valves 115 may include at least one valve device that controls water flow to a plurality of water dispensing devices, such as sprinklers. Each valve may control water flow to at least one sprinkler zone of the sprinkler zones 120. Each sprinkler zone may include, for example, a plurality of sprinkler heads that supply a volume of water to a certain portion of a lawn or garden. While the term sprinkler is used to describe the sprinkler valves 115 and sprinkler zones 120, other types of water dispensing devices may be used in place of or in addition to sprinklers for dispensing water in the sprinkler system. Typically, less than all of the sprinkler valves 115 are turned on at a given time in order to maintain sufficient pressure in the sprinkler system to dispense water from the sprinklers or other water-dispensing devices associated with each sprinkler valve. Furthermore, operating less than all of the sprinkler zones at a given time permits the user to direct water to specific portions of the property for different amounts of time.

Figure 2:
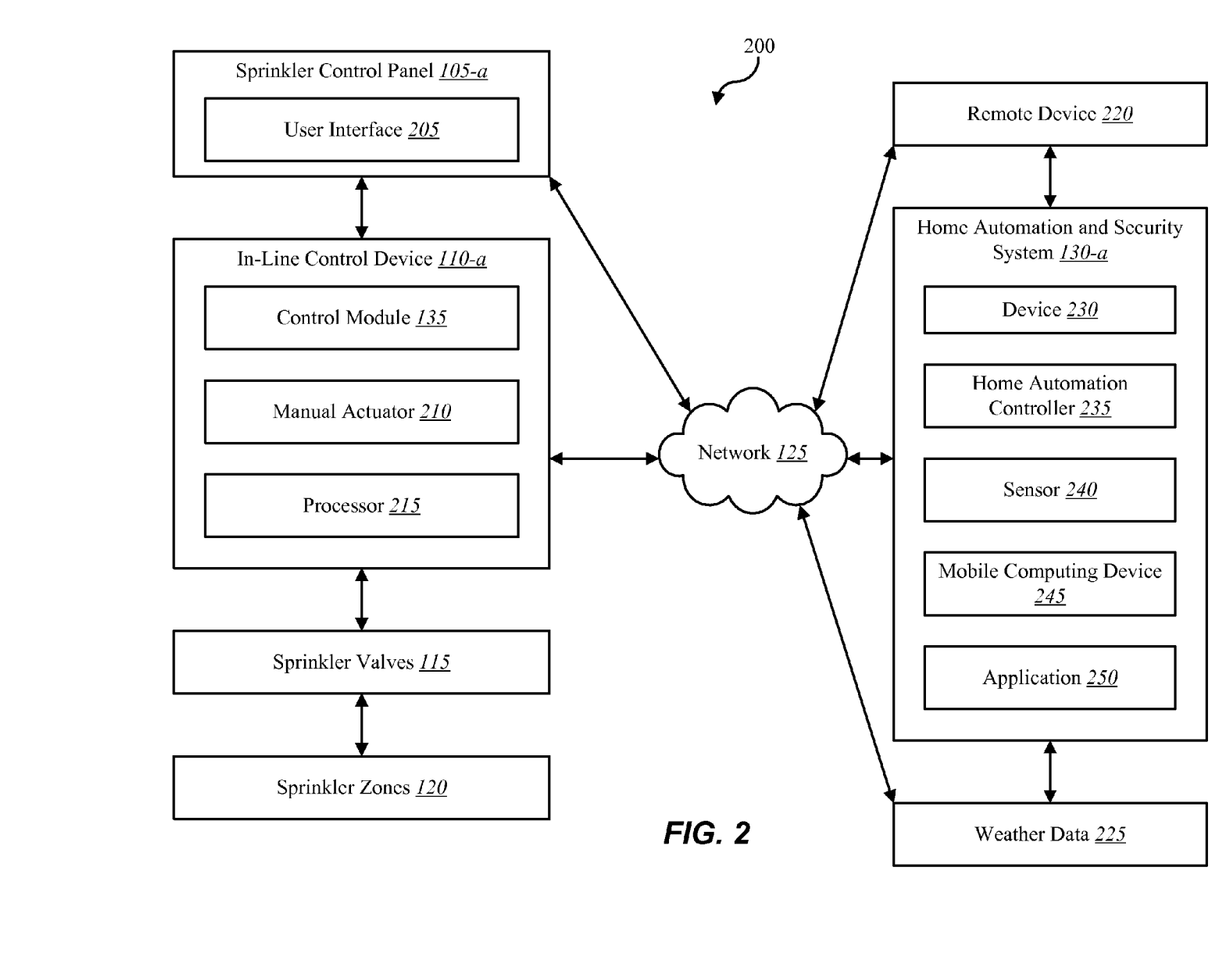
FIG. 2 is a block diagram of an environment in which the present systems and methods may be implemented.

Referring now to FIG. 2, a block diagram illustrates one embodiment of an environment 200 in which the present system and methods may be implemented. The environment 200 may include a sprinkler control panel 105-*a*, an in-line control device 110-*a*, sprinkler valves 115, sprinkler zones 120, network 125, and home automation and security system 130-*a*. Sprinkler control panel 105-*a* and in-line control device 110-*a* are examples of sprinkler control panel 105 and in-line controller 110, respectively, shown in FIG. 1. The sprinkler control panel 105-*a* may include a user interface 205. In-line control device 110-*a* may include control module 135, a manual actuator 210, and a processor 215. Home automation and security system 130-*a* may include a device 230, a home automation controller 235, a sensor 240, a mobile computing device 245, and an application 250. Environment 200 may additionally include a remote device 220 and weather data 225.

The user interface 205 of sprinkler control panel 105-*a* may provide an interface for a user to control the sprinkler control panel 105-*a*, adjust settings, and turn on and off the sprinkler control system. User interface 205 may include a screen, touch panel, dial, and a variety of input buttons.

In addition to control module 135, in-line control device 110-*a* may include a manual actuator 210 as described above. Manual actuator 210 may include one or more on/off switches, buttons, or other input features that are operable to program in-line control device 110-*a* and/or operate in-line control device 110-*a* into various modes of operation. At least some of the modes of operation include a snooze or rain delay mode for a limited amount of time, an on/off mode for any one of the sprinkler valves 115, or an on/off mode for the entire in-line control device 110-*a*. In at least some examples, manual actuator 210 provides simplified functionality as compared to the functionality available for the sprinkler control panel 105-*a* via user interface 205. Manual actuator 210 may have relatively simplified operation to provide a minimum amount of training and knowledge by a user to attain familiarity with operation of in-line control device 110-*a* at the location of in-line control device 110-*a*. In other embodiments, in-line control device 110-*a* is configured as a black box with no manual actuators or other means of manually operating or controlling features of in-line control device 110-*a*.

Processor 215 may provide functionality and logic for in-line control device 110-*a*. For example, in-line control device 110-*a* may monitor operation of sprinkler valves 115, and/or operation of sprinkler control panel 105-*a*. The monitored operation may be analyzed or processed using processor 215 and the output of processor 215 is made available to a user or system (e.g., home automation and security system 130-*a*). The data collected by in-line control device 110-*a* may be used for purposes of future programming and operation of the sprinkler system. In at least some examples, the monitored activity collected by in-line control device 110-*a* may be used to create automated responses such as, for example, automatically turning on or off sprinkler valves 115 when a certain number of minutes of operation have occurred within a given time period. In-line control device 110-*a* may include additional features and functionalities described below with reference to FIG. 3.

Home automation and security system 130-*a* may include various features, components, and functionality related to automation and/or security associated with a home or business, as well as providing controls of a sprinkler system and/or components of a sprinkler system (e.g., the in-line control device 110-*a*). Device 230 may be configured as, for example, a control panel for home automation and security system 130-*a*. Device 230 may include components such as, for example, a user interface and a processor. Various other components of home automation and security system 130-*a* may be included internal the device 230. Home automation and security system 130-*a* may include a plurality of devices 230 positioned at various locations on a property or a remote location. A user may access functionality of home automation and security system 130-*a*, including operation of in-line control device 110-*a*, via any one of the devices 230.

Home automation controller 235 may include, for example, a dedicated home automation computing device (e.g., a wall-mounted controller), a personal computing device (e.g., laptop, desktop, etc.), a mobile computing device (e.g., a tablet computing device, smartphone, etc.), and the like. Home automation controller 235 may be integrated into device 230.

Sensor 240 may represent one or more separate sensors or a combination of two or more sensors in a single sensor device. For example, sensor 240 may represent one or more camera sensors and one or more motion sensors connected to environment 200. Additionally, or alternatively, sensor 240 may represent a combination sensor, such as both a camera sensor and a motion sensor integrated into the same sensor device. Additionally, or alternatively, sensor 240 may be integrated with a home appliance or fixture, such as a light bulb fixture. Sensor 240 may include an accelerometer to enable sensor 240 to detect a movement. Sensor 240 may include a wireless communication device that enables sensor 240 to send and receive data and/or information to and from one or more devices in environment 200, such as in-line control device 110-*a*. Additionally, or alternatively, sensor 240 may include a GPS sensor to enable to sensor 240 to track a location of sensor 240. Sensor 240 may include a proximity sensor to enable sensor 240 to detect proximity of a user relative to a predetermined distance from a dwelling (e.g., geo-fencing). Sensor 240 may include one or more security detection sensors, such as, for example, a glass-break sensor, a motion detection sensor, or both. Additionally, or alternatively, sensor 240 may include a smoke detection sensor, a carbon monoxide sensor, or both. Sensor 240 may include the capability to determine current weather conditions such as temperature, humidity, barometric pressure, wind speed, precipitation, etc. and transmit that information to in-line control device 110-*a* and/or automation and security system 130-*a*.

Mobile computing device 245 may provide access to the functions of device 230 and/or home automation controller 235. For example, in some embodiments, mobile computing device 245 includes a mobile application that interfaces with one or more functions of device 230 and/or home automation controller 235. Mobile computing device 245 may include features and/or functionality in common with remote device 220. Remote device 220 may be one example of mobile computing device 245, or vice versa.

Application 250 may allow a user to control (either directly or via home automation controller 235) an aspect of the monitored property, including security, energy management, locking or unlocking a door, checking the status of a door, locating a user or item, controlling lighting, thermostat, cameras, receiving notification regarding a current status or anomaly associated with a home, office, place of business, and the like. In some configurations, application 250 may enable device 230 to interface with home automation controller 235 to display automation, security, and/or energy management content on device 230 and/or mobile computing device 245. Thus, application 250 may allow users to control aspects of their homes, office, and/or other types of property or feature associated with the property, such as sprinkler control panel 105-a and/or in-line control device 110-a.

In operation, home automation and security system 130-a may provide at least one mechanism for a user to provide input or instructions for controlling in-line control device 110-a. Another way to provide instructions to in-line control device 110-a may be the remote device 220. Remote device 220 may send instructions directly to in-line control device 110-a via network 125. Additionally, or alternatively, remote device 220 may be used to provide instructions for operation of in-line control device 110-a via home automation and security system 130-a, which delivers the instructions via network 125 to in-line control device 110-a. Remote device 220 may represent a plurality of remote devices, any one of which may be used to provide instructions for operating in-line control device 110-a. For example, remote device 220 may be a smartphone that a user operates to generate instructions that are sent via network 125 to in-line control device 110-a to turn on or off sprinkler valves 115 thereby operating at least one sprinkler zone 120 independent of instructions or operation of sprinkler control panel 105-a. In another example, remote device 220 includes a tablet computer that a user operates at his place of employment, which is remote from the property being monitored by home automation and security system 130-a and the associated location of in-line control device 110-a. The user may input instructions that are delivered via the tablet over network 125 either directly to in-line control device 110-a or to home automation and security system 130-a, which then transmits the instructions via network 125 to in-line control device 110-a.

In-line control device 110-a may operate as an automated system configured to control sprinkler valves 115 in response to data received from a remote source to home automation and security system 130-a, remote device 220, or directly to in-line control device 110-a. Example data may include weather data, such as, for example, temperature, wind speed and direction, precipitation, humidity, sunrise and sunset times, air quality, ozone level, and cloud cover. The weather data may be past, current or forecast weather conditions. The weather data may be used to create instructions for automatic control of in-line control device 110-a. Alternatively, the weather data may be provided to a user whether as raw data or as at least partially processed or analyzed data in which a plurality of operational functions are made available to the user. The user may then select among a variety of instruction options for controlling in-line control device 110-a to control sprinkler valves 115. Other data that may be supplied and considered for manual or automated use or operation of in-line control device 110-a may include power consumption, water consumption, soil moisture content, seasonal information such as calendar days for the beginning or end of summer, and the like. The data may also include information related to maintenance of the sprinkler system, such as, for example, schedules for checking dirty or clogged filters, checking for proper adjustment of sprinkler heads, etc.

Figure 3:
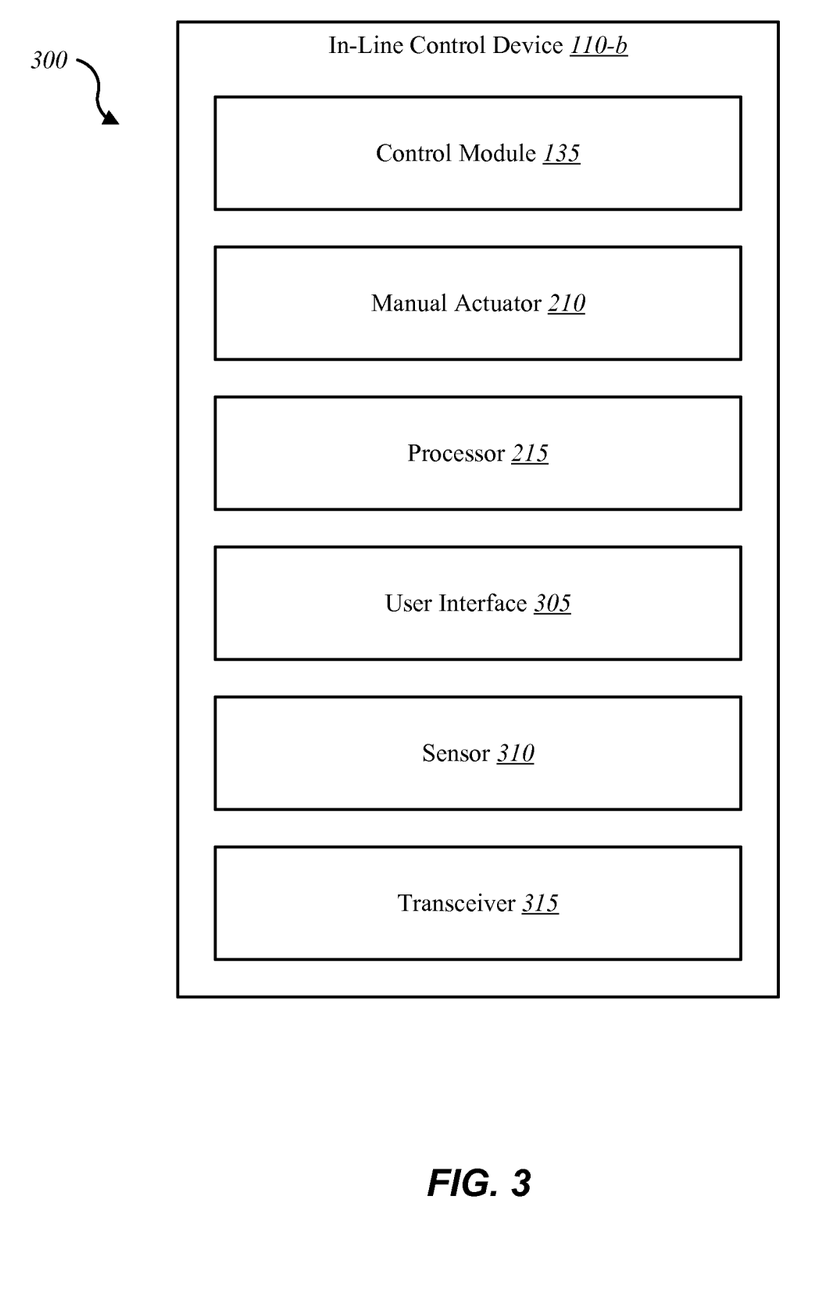
FIG. 3 is a block diagram of one example of an in-line sprinkler control device of FIG. 1 and FIG. 2.

FIG. 3 is a block diagram 300 illustrating one example of an in-line control device 110-b. In-line control device 110-b may be one example of in-line control device 110 depicted in FIGS. 1 and/or 2. As depicted, in-line storage device 110-b may include control module 135, manual actuator 210, processor 215, user interface 305, sensor 310, and transceiver 315. In-line control device 110-b may include additional or fewer modules and/or components in other embodiments. Control module 135, manual actuator 210, and processor 215 may include the same or similar functionality as described above with referenced to FIGS. 1 and 2.

User interface 305 may include physical input interfaces or virtual input interfaces that include, for example, one or more numeric keypads (e.g., for entering a code or instruction, etc.), sensor activation buttons, programming dials, touch screens, etc. The user interface 305 may also include capability for receiving and/or delivering audio communications such as spoken instructions. For example, user interface 305 may include a speaker and a microphone.

Sensor 310 may include any of the features and functionality described above related to sensor 240. Sensor 310 may include, for example, a rain sensor, a temperature sensor, a wind sensor, or any other sensor that may be used to collect data that may influence when and how the in-line control device 110-b may be operated to provide dispensing of water via sprinkler valves 115 and/or sprinkler zones 120.

Transceiver 315 may provide communications to and from another device such as, for example, home automation and security system 130 and/or remote device 220. Transceiver 315 may be configured to communicate via a hardwired or wireless network interface with one or more computing devices connected to a network (e.g., network 125), such as a local area network (LAN), a wide area network (WAN), or the Internet. Transceiver permits in-line control device 110-b to receive pertinent information, such as local weather data, from an external source, and to communicate with one or more remote computing devices, sprinkler control panel 105, and/or sprinkler valves 115 shown in FIGS. 1 and 2.

Figure 4:
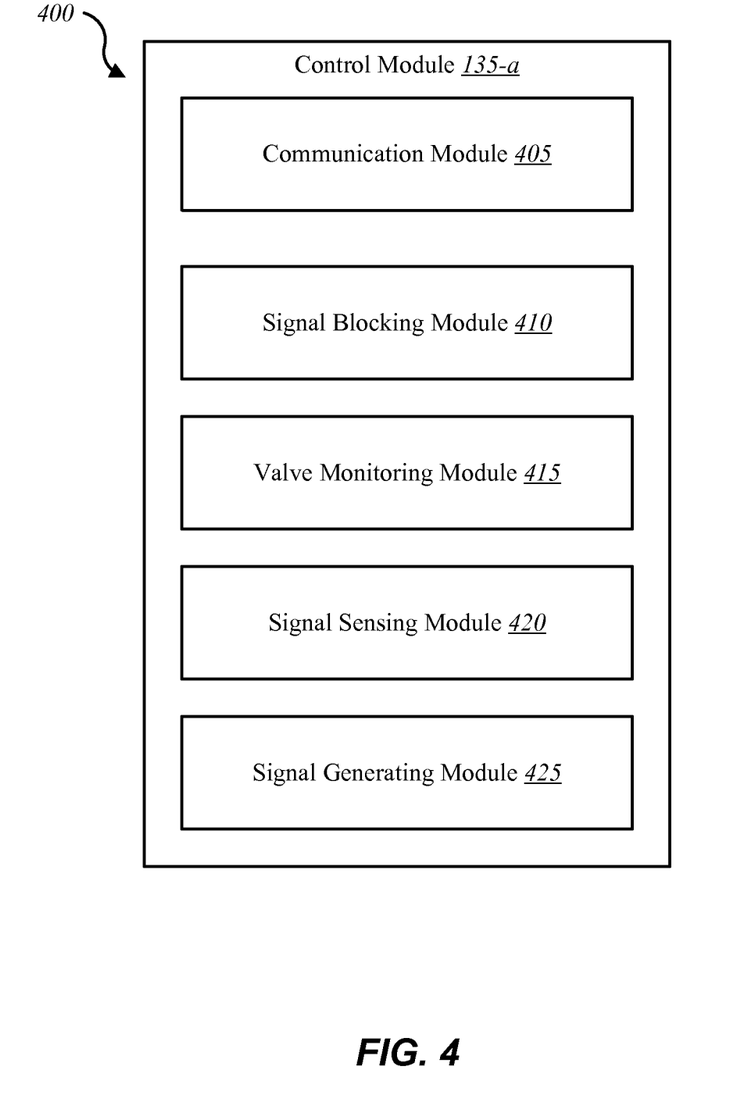
FIG. 4 is a block diagram of one example of a control module of the in-line sprinkler control device of FIGS. 1-3.

FIG. 4 is a block diagram 400 illustrating one example of a control module 135-a. Control module 135-a may be one example of control module 135 depicted in FIGS. 1 and/or 2. As depicted, control module 135-a may include communication module 405, signal blocking module 410, valve monitoring module 415, signal sensing module 420, and signal generating module 425. Control module 135-a may include additional or fewer modules and capability in other embodiments.

Communication module 405 may provide communication between in-line control device 110 and other devices, such as, for example, automation and security system 130, remote device 220, and sprinkler control panel 105. Communication module 405 may integrate transceiver 315 or other hardware and software. Communication module 405 may provide communication from in-line control device 110 to sprinkler valves 115. Communication module 405 may also provide communication with sensors and other sources of data.

Signal blocking module 410 may provide interception and/or blocking of signals sent from sprinkler control panel 105, which are intended for control of sprinkler valves 115. In one operational mode, signal blocking module 410 may block the signals from the sprinkler control panel 105 from reaching sprinkler valves 115. In another mode of operation, signal blocking module 410 may operate to pass the signals from sprinkler control panel 105 to sprinkler valves 115.

Valve monitoring module 415 may provide monitoring of an operational condition of one or more of the sprinkler valves 115. Valve monitoring module 415 may gather data related to usage of sprinkler valves 115, maintenance, etc. The information collected by valve monitoring module 415 may be delivered to a remote site, such as, for example, remote device 220 and/or home automation and security system 130. The information collected by valve monitoring module 415 may be utilized by in-line control device 110 (e.g., processor 215) as part of determining whether to manually or automatically operate sprinkler valves 115.

Signal sensing module 420 may be used to determine whether signals are being sent or received from home automation and security system 130 and/or remote device 220, as well as to or from sprinkler control panel 105. In response to information collected by signal sensing module 420, control module 135-a may operate signal blocking module 410 to block the signal or pass the signal (in the case of signals received from sprinkler control panel 105).

Signal-generating module 425 may be used to generate various signals, data, or instructions associated with operation of in-line control device 110, sprinkler control panel 105, and/or sprinkler valves 115 and sprinkler zones 120. The generated signals from signal-generating module 425 may be communicated via communication module 405.

Figure 5:
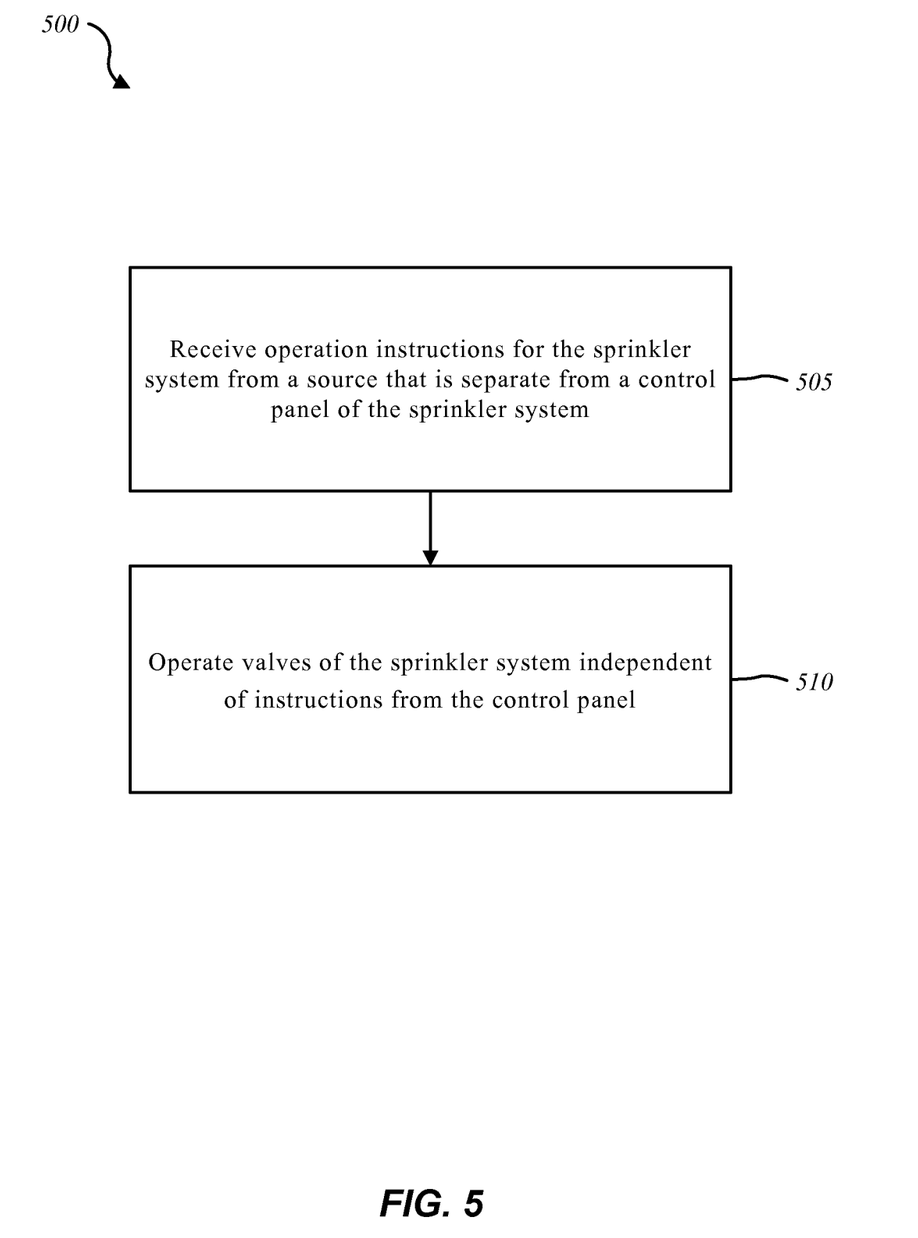
FIG. 5 is a flow diagram illustrating a method for controlling a sprinkler system according to various embodiments of FIG. 1 and FIG. 2.

FIG. 5 illustrates a flow diagram representing a method for sprinkler system control in accordance with the present disclosure. At block 505, new method includes receiving operation instructions for the sprinkler system from a source that is separate from a control panel of the sprinkler system. Block 510 includes operating valves of the sprinkler system independent of instructions from the control panel.

Other steps of the method 500 may include, for example, overriding any instructions from the control panel to the valves, positioning the apparatus for sprinkler system control in-line between the sprinkler system control panel and the valves, receiving communications from a home automation system, communicating valve operations status information to the home automation and security system, actuating a system delay button as part of receiving the operation instructions, receiving communications from a mobile device as part of receiving operation instructions, and/or operating the valve to the sprinkler system by operating a limited number of the valves.

Figure 6:
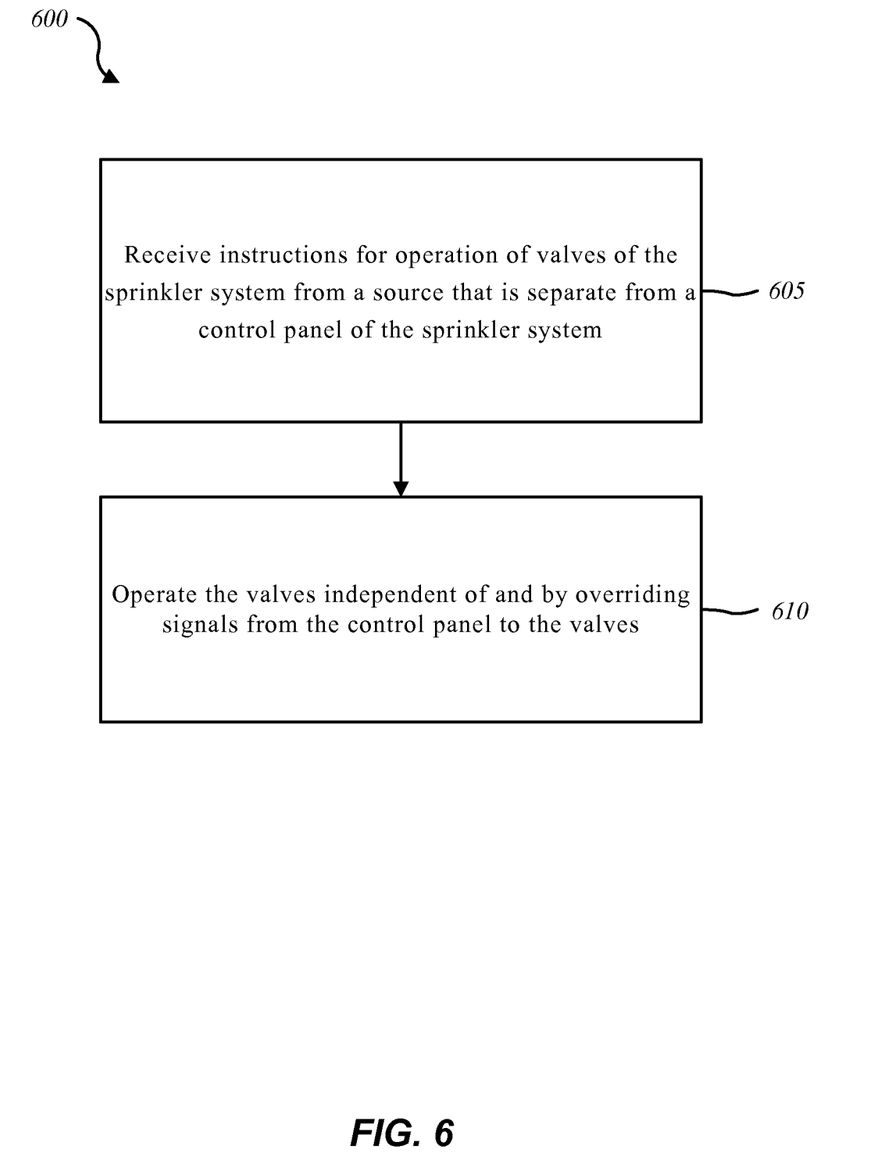
FIG. 6 is a flow diagram illustrating a method for controlling a sprinkler system according to various embodiments of FIG. 1 and FIG. 2.

Referring now to FIG. 6, a flow diagram illustrates a method 600 for controlling a sprinkler system. At block 605, the method includes receiving instructions for operation of valves to the sprinkler system from a source that is separate from a control panel of the sprinkler system. At block 610, the valves are operated independent of and by overriding signals from the control panel to the valves.

Further steps of the method 600 may include receiving instructions from an automation and security system, receiving instructions from a remote device, directing the instructions from the remote device through a control panel of an automation and security system, blocking signals from the control panel to the valve prior to operating the valves, monitoring the frequency and duration of operation of the valves, and/or turning the valves on and off and operating the valves for select periods of time as part of operating the valves and the sprinkler system.

Figure 7:
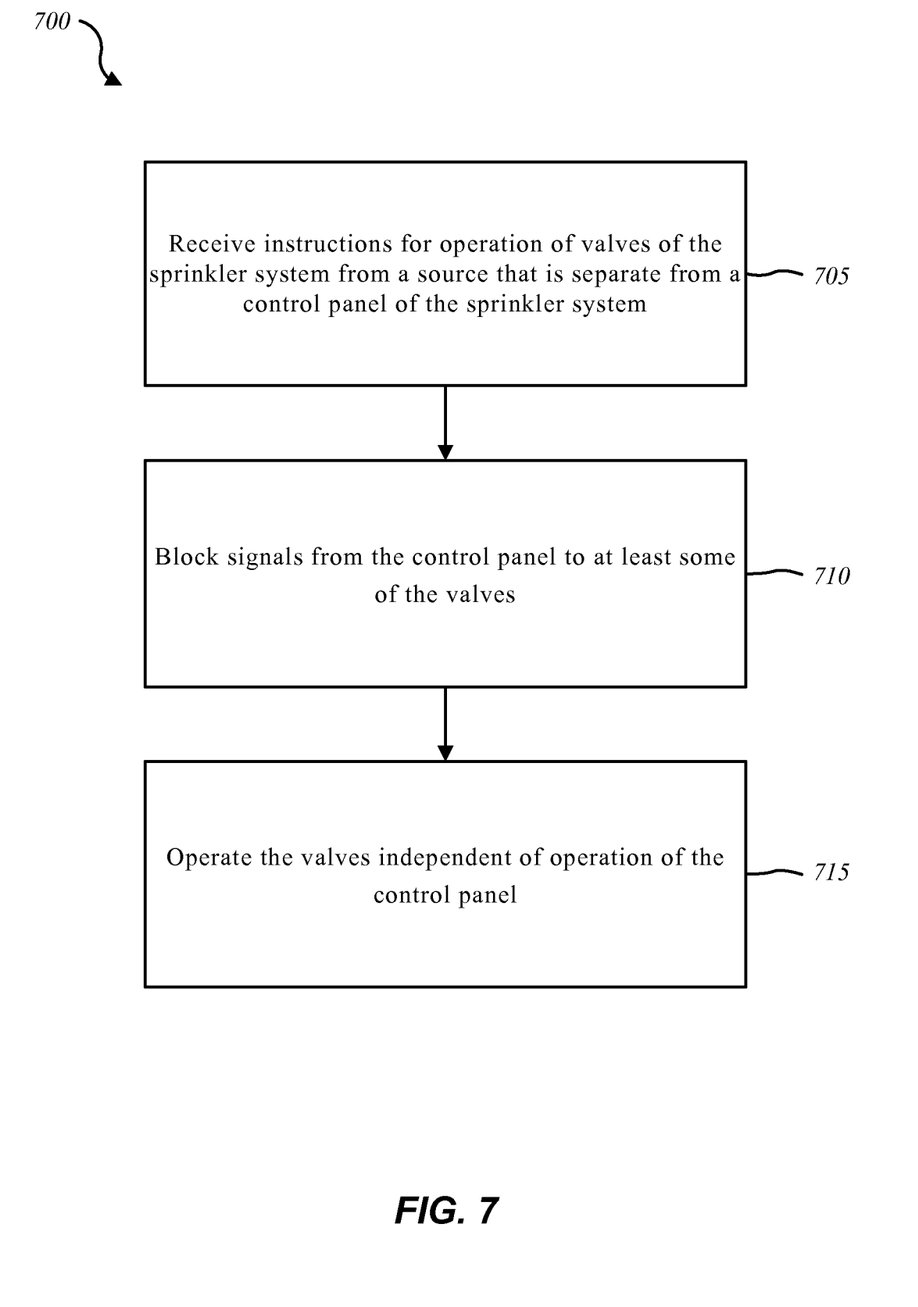
FIG. 7 is a flow diagram illustrating a method for controlling a sprinkler system according to various embodiments of FIG. 1 and FIG. 2.

Referring now to FIG. 7, a flow diagram shows a method 700 for controlling a sprinkler system. Block 705 includes receiving instructions for operation of valves to the sprinkler system from a source that is separate from a control panel of the sprinkler system. Block 710 includes blocking signals from the control panel to at least some of the valves. Block 715 includes operating the valves independent of operation of the control panel.

Further steps of the method 700 may include transmitting information related to operation of the valves to an automation and security system, transmitting information related to operation of the valves to a remote device that is separate from the control panel, and/or receiving instructions from an automation and control security system as part of receiving the instructions.

Figure 8:
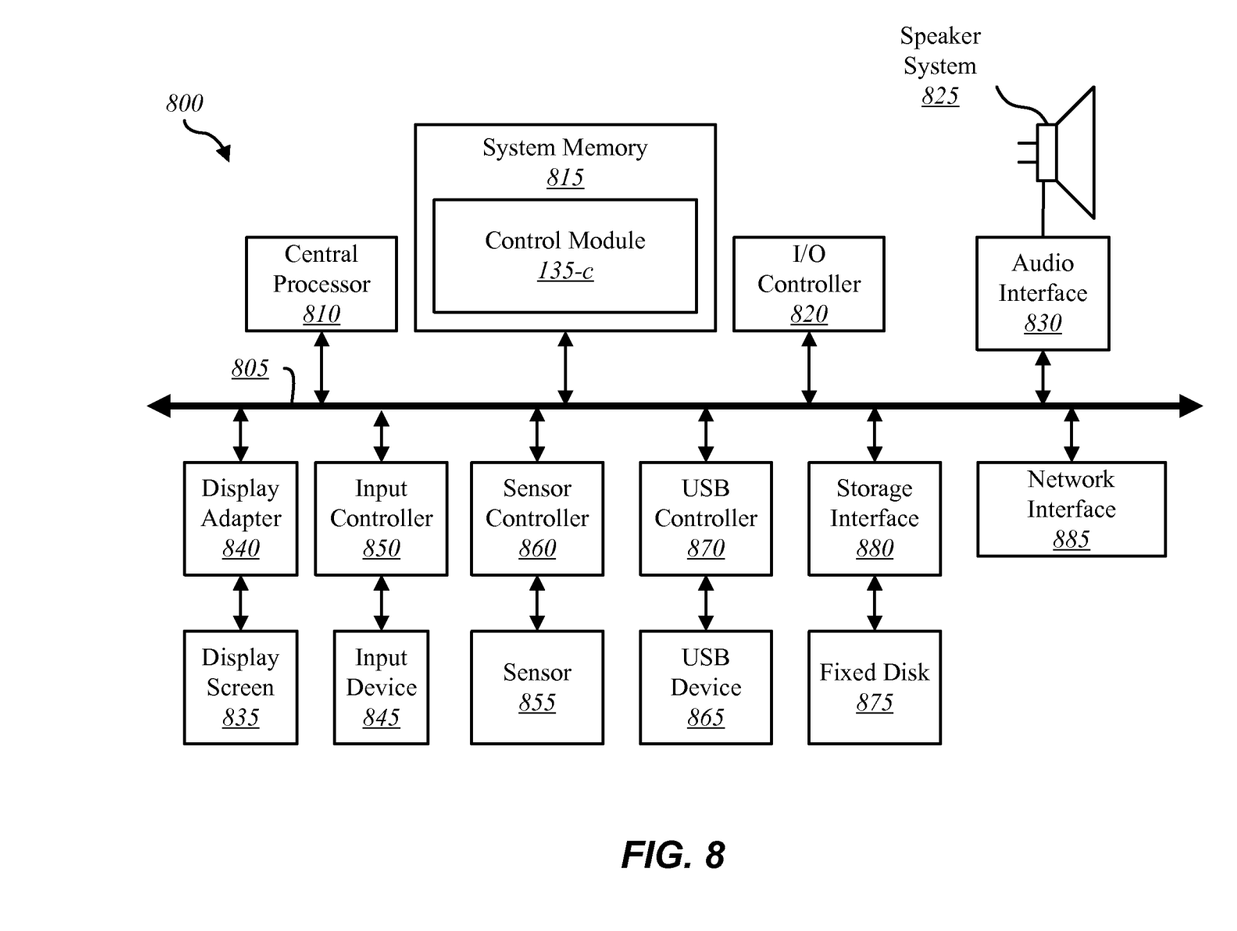
FIG. 8 is a block diagram of a computer system suitable for implementing the present systems and methods of FIGS. 1-8.

FIG. 8 depicts a block diagram of a controller 800 suitable for implementing the present systems and methods. The controller 800 may be an example of in-line control device 110 illustrated in FIG. 1. In one configuration, controller 800 includes a bus 805 which interconnects major subsystems of controller 800, such as a central processor 810, a system memory 815 (typically RAM, but which may also include ROM, flash RAM, or the like), an input/output controller 820, an external audio device, such as a speaker system 825 via an audio output interface 830, an external device, such as a display screen 835 via display adapter 840, an input device 845 (e.g., remote control device interfaced with an input controller 850), multiple USB devices 865 (interfaced with a USB controller 870), and a storage interface 880. Also included are at least one sensor 855 connected to bus 805 through a sensor controller 860 and a network interface 885 (coupled directly to bus 805).

Bus 805 allows data communication between central processor 810 and system memory 815, which may include read-only memory (ROM) or flash memory (neither shown), and random access memory (RAM) (not shown), as previously noted. The RAM is generally the main memory into which the operating system and application programs are loaded. The ROM or flash memory can contain, among other code, the Basic Input-Output system (BIOS) which controls basic hardware operation such as the interaction with peripheral components or devices. For example, the control module 135-c to implement the present systems and methods may be stored within the system memory 815. Applications resident with controller 800 are generally stored on and accessed via a non-transitory computer readable medium, such as a hard disk drive (e.g., fixed disk 875) or other storage medium. Additionally, applications can be in the form of electronic signals modulated in accordance with the application and data communication technology when accessed via network interface 885.

Storage interface 880, as with the other storage interfaces of controller 800, can connect to a standard computer readable medium for storage and/or retrieval of information, such as a fixed disk drive 875. Fixed disk drive 875 may be a part of controller 800 or may be separate and accessed through other interface systems. Network interface 885 may provide a direct connection to a remote server via a direct network link to the Internet via a POP (point of presence). Network interface 885 may provide such connection using wireless techniques, including digital cellular telephone connection, Cellular Digital Packet Data (CDPD) connection, digital satellite data connection, or the like. In some embodiments, one or more sensors (e.g., motion sensor, smoke sensor, glass break sensor, door sensor, window sensor, carbon monoxide sensor, and the like) connect to controller 800 wirelessly via network interface 885.

Many other devices or subsystems (not shown) may be connected in a similar manner (e.g., entertainment system, computing device, remote cameras, wireless key fob, wall mounted user interface device, cell radio module, battery, alarm siren, door lock, lighting system, thermostat, home appliance monitor, utility equipment monitor, and so on). Conversely, all of the devices shown in FIG. 8 need not be present to practice the present systems and methods. The devices and subsystems can be interconnected in different ways from that shown in FIG. 8. The aspect of some operations of a system such as that shown in FIG. 8 are readily known in the art and are not discussed in detail in this application. Code to implement the present disclosure can be stored in a non-transitory computer-readable medium such as one or more of system memory 815 or fixed disk 875. The operating system provided on controller 800 may be iOS®, ANDROID®, MS-DOS®, MS-WINDOWS®, OS/2®, UNIX®, LINUX®, or another known operating system.

Moreover, regarding the signals described herein, those skilled in the art will recognize that a signal can be directly transmitted from a first block to a second block, or a signal can be modified (e.g., amplified, attenuated, delayed, latched, buffered, inverted, filtered, or otherwise modified) between the blocks. Although the signals of the above described embodiment are characterized as transmitted from one block to the next, other embodiments of the present systems and methods may include modified signals in place of such directly transmitted signals as long as the informational and/or functional aspect of the signal is transmitted between blocks. To some extent, a signal input at a second block can be conceptualized as a second signal derived from a first signal output from a first block due to physical limitations of the circuitry involved (e.g., there will inevitably be some attenuation and delay). Therefore, as used herein, a second signal derived from a first signal includes the first signal or any modifications to the first signal, whether due to circuit limitations or due to passage through other circuit elements which do not change the informational and/or final functional aspect of the first signal.

While the foregoing disclosure sets forth various embodiments using specific block diagrams, flowcharts, and examples, each block diagram component, flowchart step, operation, and/or component described and/or illustrated herein may be implemented, individually and/or collectively, using a wide range of hardware, software, or firmware (or any combination thereof) configurations. In addition, any disclosure of components contained within other components should be considered exemplary in nature since many other architectures can be implemented to achieve the same functionality.

The process parameters and sequence of steps described and/or illustrated herein are given by way of example only and can be varied as desired. For example, while the steps illustrated and/or described herein may be shown or discussed in a particular order, these steps do not necessarily need to be performed in the order illustrated or discussed. The various exemplary methods described and/or illustrated herein may also omit one or more of the steps described or illustrated herein or include additional steps in addition to those disclosed.

Furthermore, while various embodiments have been described and/or illustrated herein in the context of fully functional computing systems, one or more of these exemplary embodiments may be distributed as a program product in a variety of forms, regardless of the particular type of computer-readable media used to actually carry out the distribution. The embodiments disclosed herein may also be implemented using software modules that perform certain tasks. These software modules may include script, batch, or other executable files that may be stored on a computer-readable storage medium or in a computing system. In some embodiments, these software modules may configure a computing system to perform one or more of the exemplary embodiments disclosed herein.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the present systems and methods and their practical applications, to thereby enable others skilled in the art to best utilize the present systems and methods and various embodiments with various modifications as may be suited to the particular use contemplated.

Unless otherwise noted, the terms "a" or "an," as used in the specification and claims, are to be construed as meaning "at least one of." In addition, for ease of use, the words "including" and "having," as used in the specification and claims, are interchangeable with and have the same meaning as the word "comprising." In addition, the term "based on" as used in the specification and the claims is to be construed as meaning "based at least upon."

What is claimed is:

1. An in-line apparatus for a sprinkler system, comprising:
   a processor;
   a control component to communicate with a home automation and security system;
   a signal blocking component;
   a memory in electronic communication with the processor; and
   instructions stored in the memory, the instructions-being executable by the processor to:
      receive a first operation signal from a control panel of the sprinkler system;
      receive a second operation signal from a source that is separate from the control panel of the sprinkler system;
      determine the source of the second operation signal;
      determine whether the in-line apparatus is operating in a first mode that allows reception of the first operation signal from the control panel and the second operation signal, and transmitting only the received first operation signal to a valve of the sprinkler system, and whether the in-line apparatus is operating in a second mode that allows reception of the first operation signal and reception of the second operation signal and blocks at least one of the first operation signal or the second operation signal from being transmitted to the valve; and
      initiate operation of the valve of the sprinkler system based at least in part on the whether the in-line apparatus operates in the first mode or the second mode.

2. The apparatus of claim 1, wherein operating the valve of the sprinkler system includes overriding the first operation signal received from the control panel.

3. The apparatus of claim 1, wherein the apparatus is positioned in-line between the control panel and the valve.

4. The apparatus of claim 1, wherein receiving the second operation signal includes receiving communications from the home automation and security system.

5. The apparatus of claim 4, wherein the instructions are executable by the processor to:
   communicate valve operation status information to the home automation and security system.

6. The apparatus of claim 4, wherein the communications are received via a wireless network.

7. The apparatus of claim 1, wherein receiving the second operation signal includes actuation of a system delay button.

8. The apparatus of claim 1, wherein receiving the second operation signal includes receiving communications from a mobile device.

9. The apparatus of claim 1, wherein operating the valve of the sprinkler system includes operating a limited number of a plurality of valves.

10. A computer-program product for controlling a sprinkler system, the computer-program product comprising a non-transitory computer-readable medium storing instructions executable by a processor to:
receive first instructions for operating valves of the sprinkler system from a control panel of the sprinkler system;
receive second instructions for operation of the valves of the sprinkler system from an automation system that is separate from the control panel of the sprinkler system;
determine that the second instructions were received from the automation system;
determine whether the processor is operating in a first mode that allows reception of the first operation signal from the control panel and the second operation signal and transmitting only the first instructions to the valves of the sprinkler system, and whether the processor is operating in a second mode that allows reception of the first instructions and reception of the second instructions and blocks at least one of the first instructions or the second instructions from being transmitted; and
initiate operation of the valves based at least in part on whether the processor is operating in the first mode or the second mode.

11. The computer-program product of claim 10, wherein receiving the second instructions includes receiving the second instructions from a remote device.

12. The computer-program product of claim 11, wherein the second instructions received from the remote device are directed through a control panel of an automation and security system.

13. The computer-program product of claim 10, wherein the instructions are executable by the processor to:
block the first instructions received from the control panel of the sprinkler system from reaching the valves prior to operating the valves.

14. The computer-program product of claim 10, wherein the instructions are executable by the processor to:
monitor frequency and duration of the operation of the valves.

15. The computer-program product of claim 10, wherein operating the valves of the sprinkler system includes turning the valves on and off and operating the valves for select time periods.

16. The apparatus of claim 1, wherein the instruction to initiate operation of the valve further comprises instructions to:
initiate transmission of the first operation signal to the valve or block at least one of the first operation signal or the second operation signal based at least in part on determining whether the in-line apparatus is operating in the first mode or the second mode.

17. The apparatus of claim 1, wherein the first mode is a sleep mode configured to allow the first operation signal to pass-through the in-line apparatus from the control panel to the valve of the sprinkler system.

18. The apparatus of claim 1, wherein the instruction to initiate operation of the valve further comprises instructions to:
enter the second mode based at least in part on receiving a user input signal indicative of a change of mode.

19. The apparatus of claim 1, wherein the first mode is a sleep state.

20. A computer-implemented method for controlling a sprinkler system, comprising:
receiving first instructions for operating valves of the sprinkler system from a control panel of the sprinkler system;
receiving second instructions for operation of the valves of the sprinkler system from a source that is separate from the control panel of the sprinkler system;
sensing the source of the received instructions;
determining a mode of operation for operating the valves of the sprinkler system, a first mode of operation allowing reception of the first instructions and the second instructions and transmitting only the first instructions to the valves of the sprinkler system and a second mode of operation allowing reception of the first instructions and reception of the second instructions and being indicative of whether the first instructions or the second instructions are blocked from being transmitted to at least one valve;
blocking the first instructions received from the control panel of the sprinkler system to at least some of the valves based at least in part on the determined mode of operation and the second instructions being received from the source separate from the control panel; and
initiating operation of the valves based at least in part on the second instructions and independent of the operation of the control panel,
wherein the blocking comprises preventing the at least some of the valves from receiving the first instructions.

21. The method of claim 20, further comprising:
transmitting information related to operation of the valves to an automation and security system.

22. The method of claim 20, further comprising:
transmitting information related to operation of the valves to a remote device that is separate from the control panel.

23. The method of claim 20, wherein receiving the second instructions includes receiving the second instructions from an automation and security system.

* * * * *